(12) United States Patent
Yin et al.

(10) Patent No.: US 11,972,525 B2
(45) Date of Patent: Apr. 30, 2024

(54) GENERATING TRAINING DATA THROUGH IMAGE AUGMENTATION

(71) Applicant: International Business Machines Corporation, Armonk, NY (US)

(72) Inventors: Kun Yan Yin, Ningbo (CN); Zhong Fang Yuan, Xi'an (CN); Yi Chen Zhong, Shanghai (CN); Lu Yu, Shanghai (CN); Tong Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 17/676,444

(22) Filed: Feb. 21, 2022

(65) Prior Publication Data

US 2023/0267684 A1 Aug. 24, 2023

(51) Int. Cl.
*G06T 17/10* (2006.01)
(52) U.S. Cl.
CPC .................................. *G06T 17/10* (2013.01)
(58) Field of Classification Search
None
See application file for complete search history.

(56) References Cited

U.S. PATENT DOCUMENTS

| | | | |
|---|---|---|---|
| 8,723,978 | B2 | 5/2014 | Kwon et al. |
| 8,762,383 | B2 | 6/2014 | Valencia-Campo et al. |
| 9,369,612 | B2 | 6/2016 | Oh et al. |
| 10,284,794 | B1 * | 5/2019 | Francois ............ H04N 23/64 |
| 2011/0191336 | A1 | 8/2011 | Wang et al. |
| 2014/0019484 | A1 | 1/2014 | Coppin et al. |
| 2015/0331929 | A1 | 11/2015 | El-Saban et al. |
| 2020/0065626 | A1 | 2/2020 | Kaufhold et al. |

OTHER PUBLICATIONS

Yu et al. Automatic 3D building reconstruction from multi-view aerial images with deep learning, Nov. 30, 2020, ISPRS Journal of Photogrammetry and Remote Sensing, 155-170 (Year: 2020).*
Chang, Text to 3D Scene Generation, A Dissertation Submitted to the Department of Computer Science and the Committee on Graduate Studies of Stanford University in Partial Fulfillment of the Requirements for the Degree of Doctor of Philosophy, Dec. 2015.
Hana et al., A New Image ClassiPcation Method Using CNN transfer learning and Web Data Augmentation, Revised date: Oct. 26, 2017Accepted date: Nov. 11, 2017.
McCann, 3D Reconstruction from Multiple Images, Nov. 2015.
Melchior, Data Augmentation with GANs for Defect Detection, Dec. 9, 2019.
Wang et al., Lychee Surface Defect Detection Based on Deep Convolutional Neural Networks with GAN-Based Data Augmentation, MDPI, published Jul. 28, 2021.

* cited by examiner

*Primary Examiner* — Robert J Craddock

(57) ABSTRACT

An example operation may include one or more of generating a three-dimensional (3D) model of an object via execution of a machine learning model on one or more images of the object, capturing a plurality of snapshots of the 3D model of the object at different angles to generate a plurality of snapshot images of the object, fusing a feature into each of the plurality of snapshots to generate a plurality of fused snapshots of the 3D model of the object, and storing the plurality of fused snapshots of the 3D model of the object in memory.

20 Claims, 16 Drawing Sheets

370
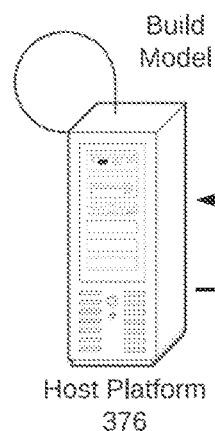
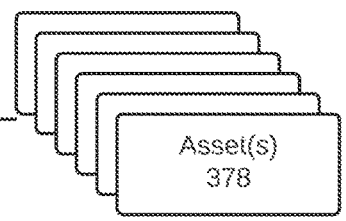
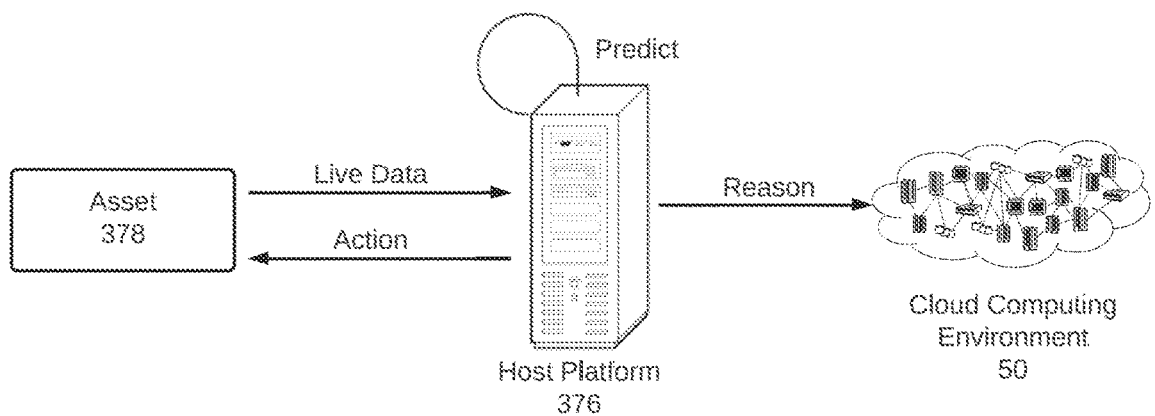
FIG. 3D

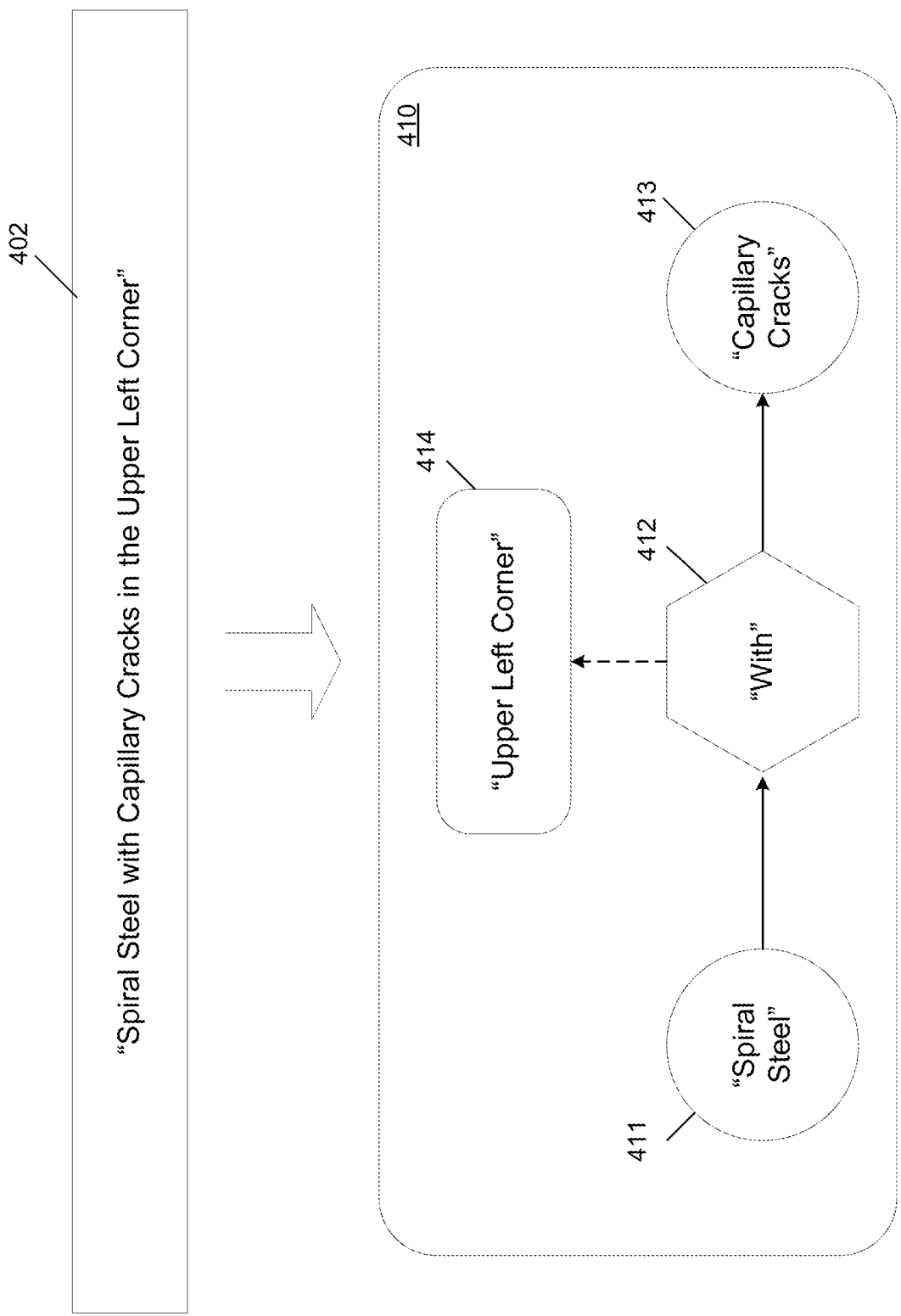

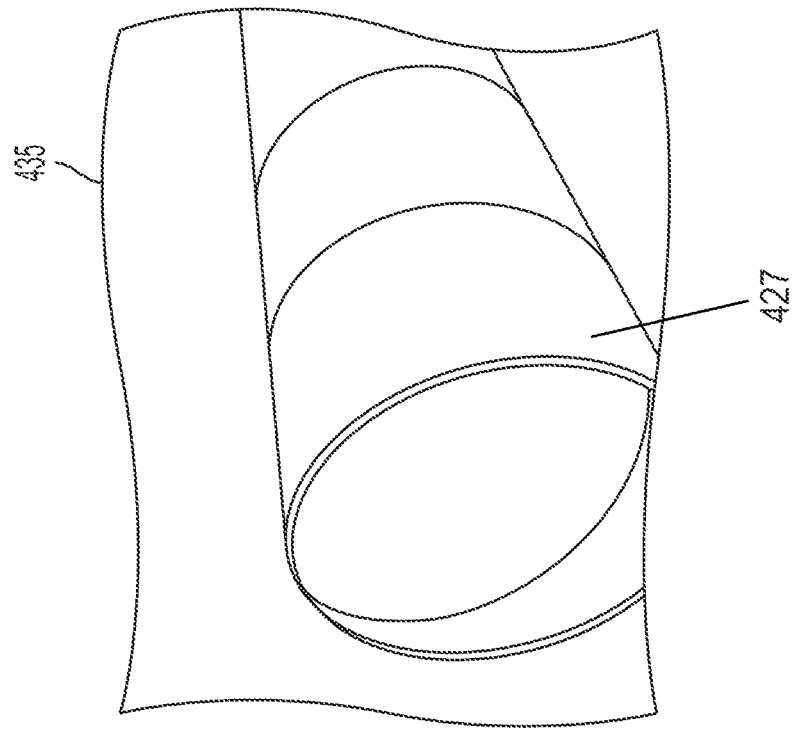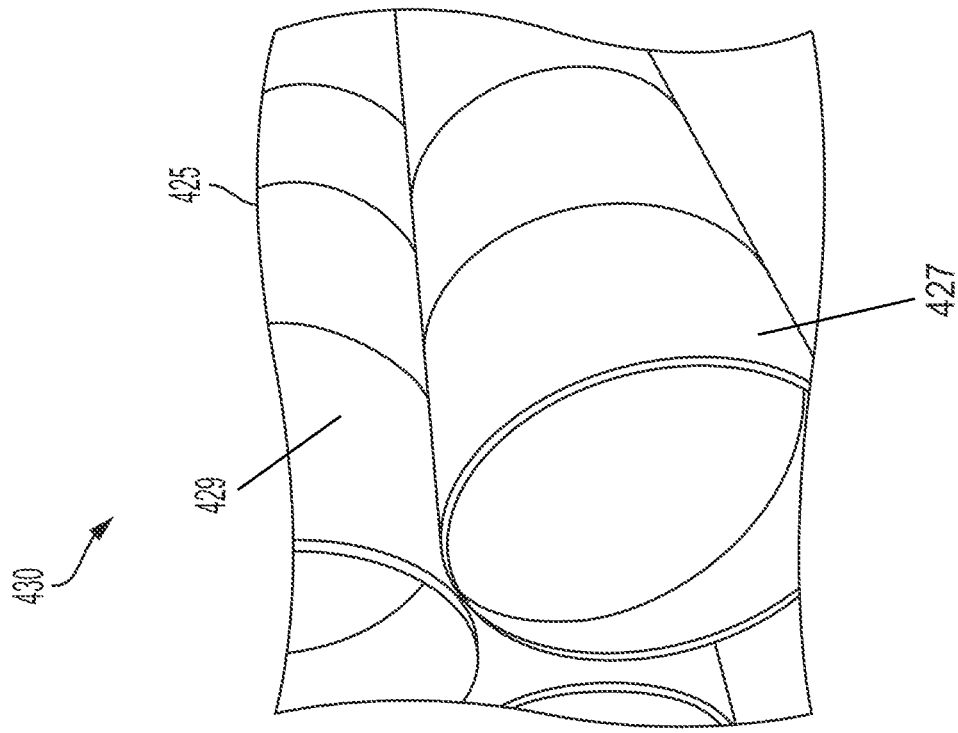
FIG. 4C

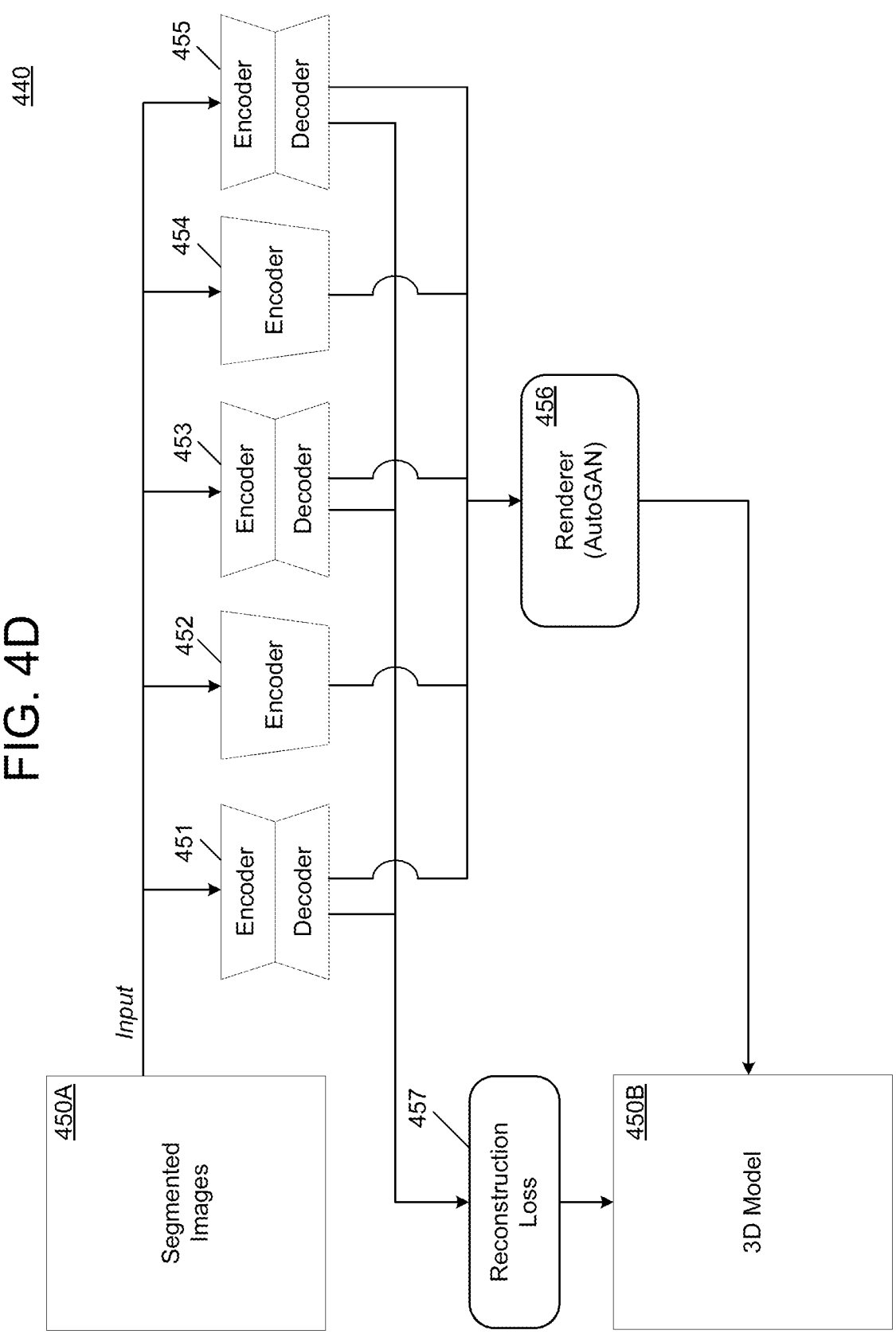

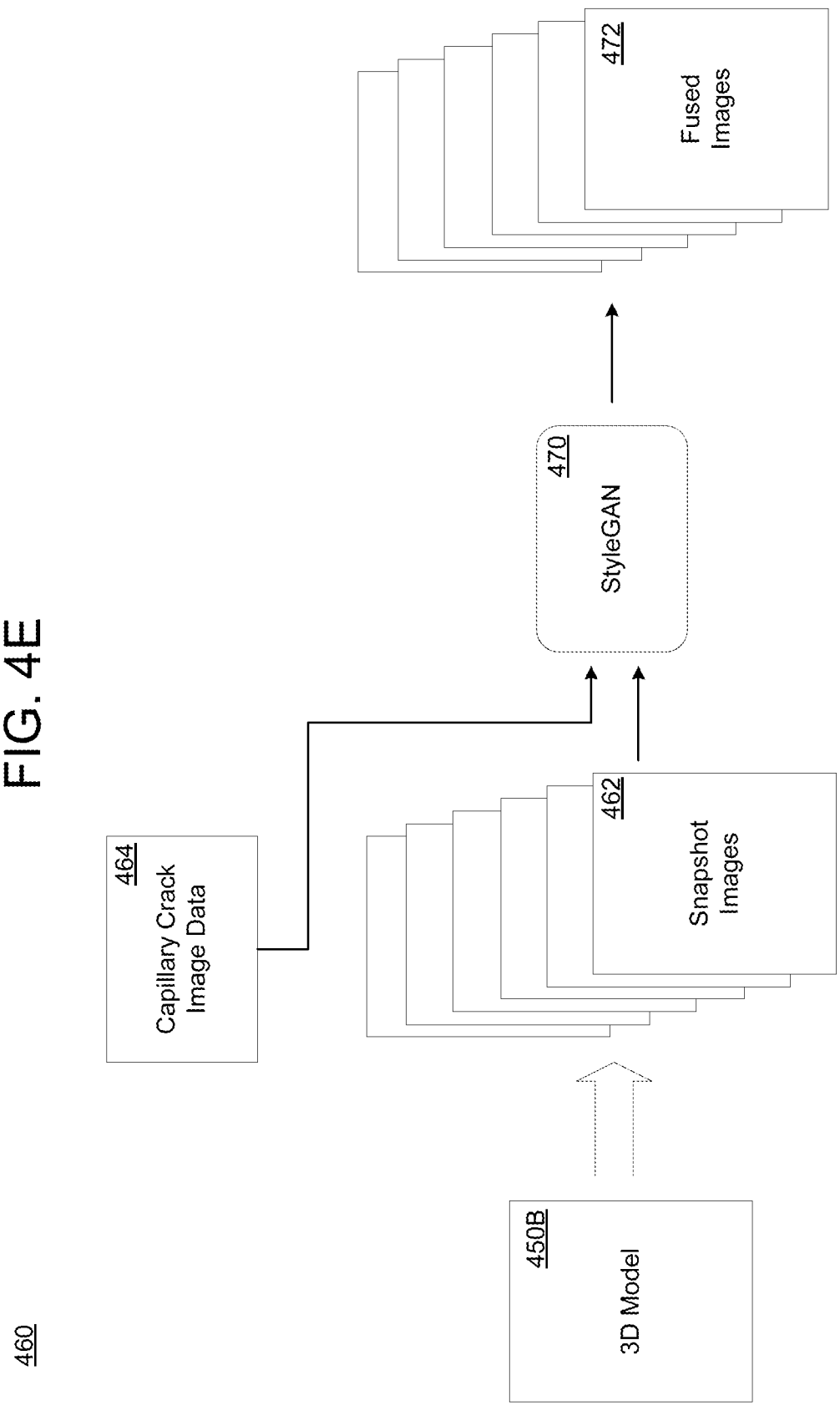

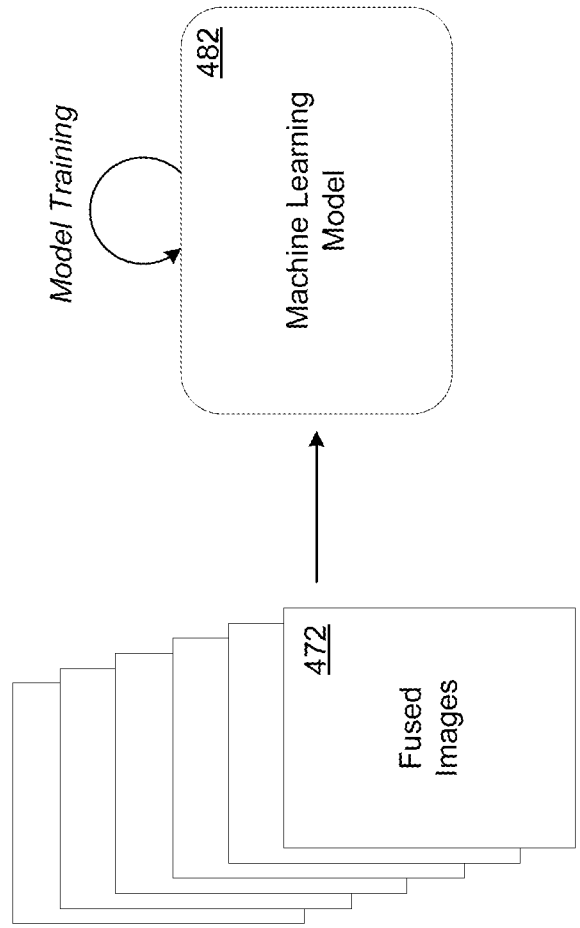

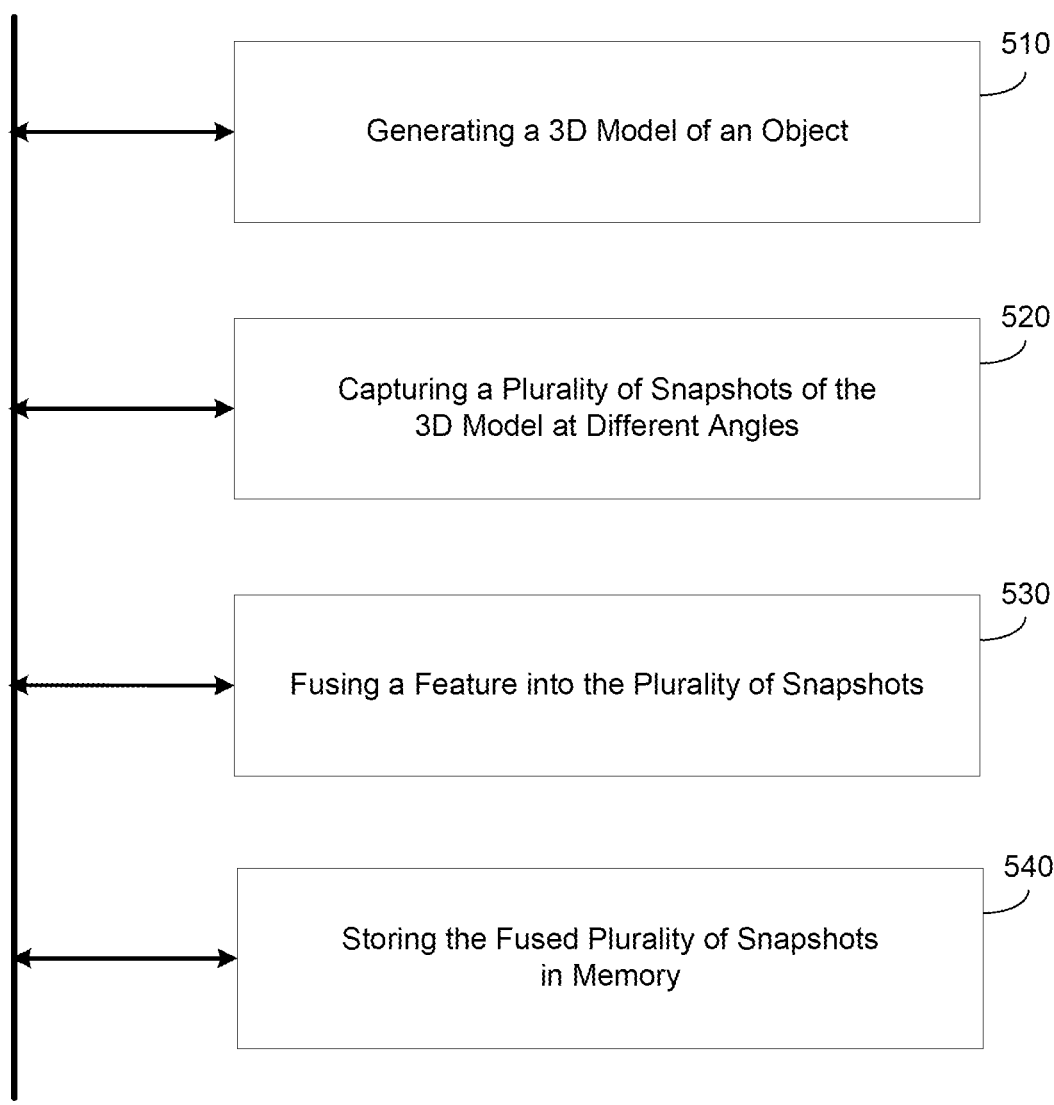

GENERATING TRAINING DATA THROUGH IMAGE AUGMENTATION

BACKGROUND

Training a model (e.g., machine learning, artificial intelligence, etc.) typically requires a large corpus of training data. For image-based models, the training data often includes many thousands of images and descriptions that are input into the machine learning model while it executes to train the machine learning model. However, not all training data is effective. As just one example, if an image-based machine learning model is trained to identify defects (e.g., cracks, holes, wearing, etc.) in a steel pipe, the image-based machine learning model must be trained using many different images of the steel pipe with various defects. However, finding such training images can be difficult. As a result, a data scientist can spend a significant amount of searching for effective training data for training a machine learning model.

SUMMARY

One example embodiment provides an apparatus that includes a processor configured to one or more of generate a three-dimensional (3D) model of an object via execution of a machine learning model on one or more images of the object, capture a plurality of snapshots of the 3D model of the object at different angles to generate a plurality of snapshot images of the object, fuse a feature into each of the plurality of snapshots to generate a plurality of fused snapshots of the 3D model of the object, and store the plurality of fused snapshots of the 3D model of the object in memory.

Another example embodiment provides a method that includes one or more of generating a three-dimensional (3D) model of an object via execution of a machine learning model on one or more images of the object, capturing a plurality of snapshots of the 3D model of the object at different angles to generate a plurality of snapshot images of the object, fusing a feature into each of the plurality of snapshots to generate a plurality of fused snapshots of the 3D model of the object, and storing the plurality of fused snapshots of the 3D model of the object in memory.

A further example embodiment provides a computer-readable medium comprising instructions, that when read by a processor, cause the processor to perform one or more of generating a three-dimensional (3D) model of an object via execution of a machine learning model on one or more images of the object, capturing a plurality of snapshots of the 3D model of the object at different angles to generate a plurality of snapshot images of the object, fusing a feature into each of the plurality of snapshots to generate a plurality of fused snapshots of the 3D model of the object, and storing the plurality of fused snapshots of the 3D model of the object in memory.

BRIEF DESCRIPTION OF THE DRAWINGS

FIG. 3D is a diagram illustrating machine learning process via a cloud computing platform according to an example embodiment.

FIG. 4A is a diagram illustrating a process of extracting elements from a string input according to an example embodiment.

FIG. 4C is a diagram illustrating a process of segmenting an image to emphasize a target region of the image according to an example embodiment.

FIG. 4D is a diagram illustrating an architecture of a machine learning model for generating a 3D model of an object according to an example embodiment.

FIG. 4E is a diagram illustrating a process of capturing snapshot images of the 3D model and fusing a feature into the snapshot images according to an example embodiment.

FIG. 4F is a diagram illustrating a process of training a machine learning model base on the fused snapshot images according to an example embodiment.

FIG. 5 is a diagram illustrating a method of generating a plurality of training images via image augmentation according to an example embodiment.

DETAILED DESCRIPTION

Figure 1:
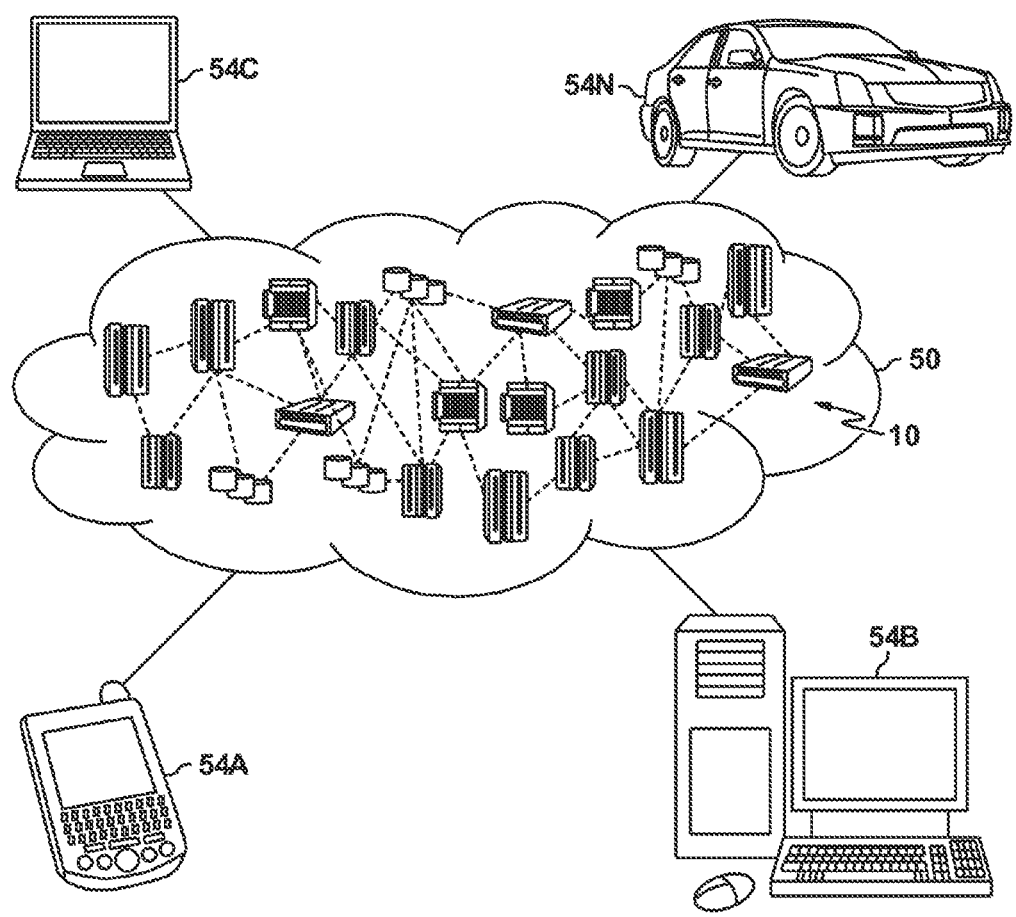
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

The example embodiments are directed to a system that can automatically generate/produce training data for training a model (e.g., artificial intelligence (AI), machine learning (ML), and the like) that can be trained using image data. The system may receive an input that describes an object to be used for model training. The object may be a physical object such as a boat, a plane, a pipe, a map, or the like. The system may convert the string of input text into images of the object described in the text. As a result, large volumes of training data for training the model can be acquired automatically. In some embodiments, the system can be an application hosted by a host platform such as a cloud computing platform.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

According to various embodiments, the system described herein may provide a user interface configured to received text input. The text input may be used by a developer of a model to describe an object that is to be used for training the model. As one example, an engineer may desire to train a machine learning model to identify cracks in spiral steel. Here, the engineer/model developer may input a search string "Spiral steel with capillary cracks in the upper left corner." In response, the system may convert the string of text into a search query that is input into an image-based search engine (e.g., public websites, custom sites, etc.). In response, the image-based search engine may produce a few results. However, it may not be enough to effectively train the model.

In the example embodiments, the system may produce a three-dimensional (3D) model of the object from the images obtained via the image-based search using an image segmentation process and one or more autoencoders. Snapshots of the 3D model can be captured at different angles of orientation to create different snapshotted images of the 3D model from various angles. For example, the software may rotate or otherwise turn the object in different ways or move the object around to obtain as many desired snapshotted images. Furthermore, the snapshotted images can be fused together with the desired features (e.g., with capillary cracks in the upper left corner) via an image-fusion model. Here, the model may fuse together a predefined image of the feature with the snapshotted images creating fused images that can be used for training the machine learning model.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
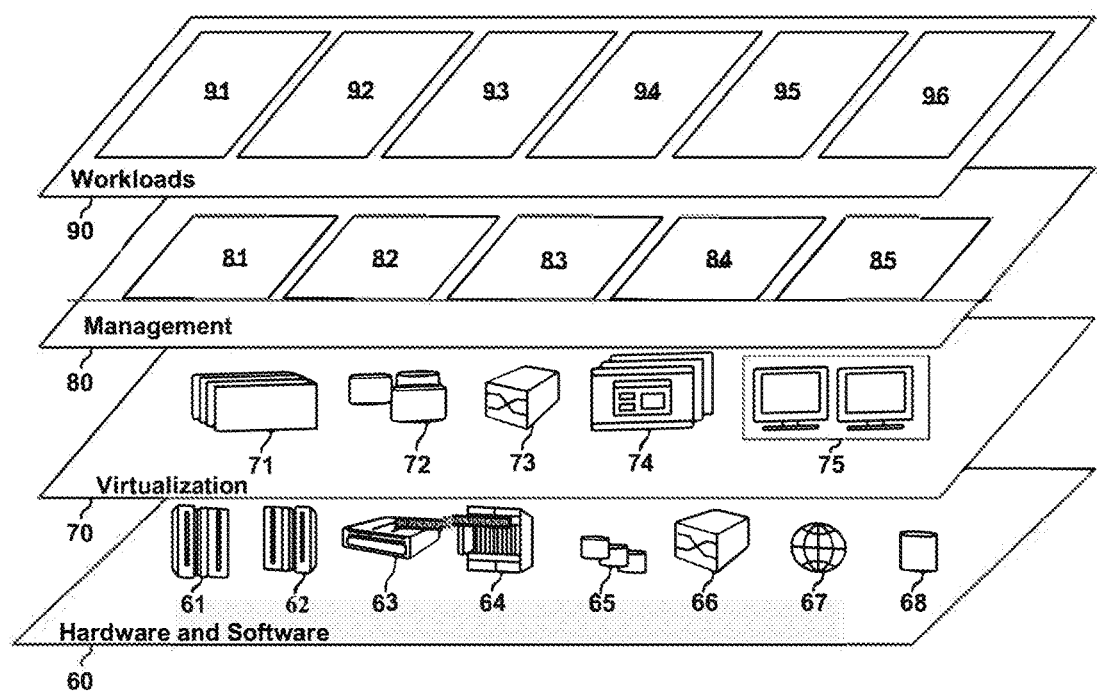
FIG. 2A is a diagram illustrating abstraction model layers of a cloud computing environment according to an example embodiment.

Referring now to FIG. 2A, a set of functional abstraction layers provided by cloud computing environment 50 (FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated training data creation 96.

Figure 2B:
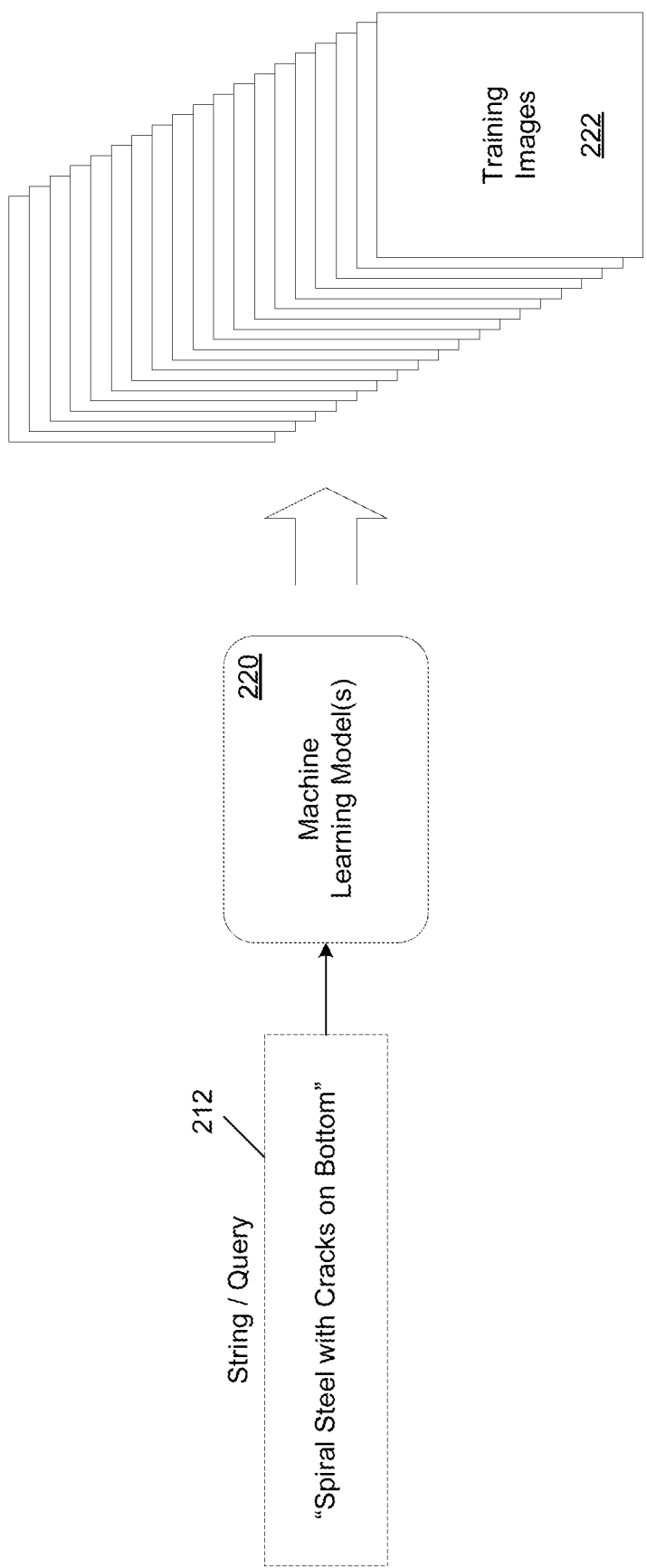
FIG. 2B is a diagram illustrating a process of generating a plurality of training images based on a string query according to an example embodiment.

For example, FIG. 2B illustrates a process 210 of generating a plurality of training images based on a string query according to an example embodiment. For example, the process 210 may be performed by a software application, service, etc. included within the automated training data creation 96 of FIG. 2A. Referring to FIG. 2B, the host platform may output a user interface 212 that receives a text input "Spiral Steel with Cracks on Bottom". Here, the user interface 212 may be part of a larger user interface that is not shown. In response, the host platform may receive the input string and execute one or more machine learning models 220 such as those further described in the examples of FIGS. 4A-4F herein. As a result, a large corpus of training images 222 is generated and stored in memory.

FIGS. 3A-3E provide various examples of additional features that may be used in association with the cloud computing environment.

Figure 3A:
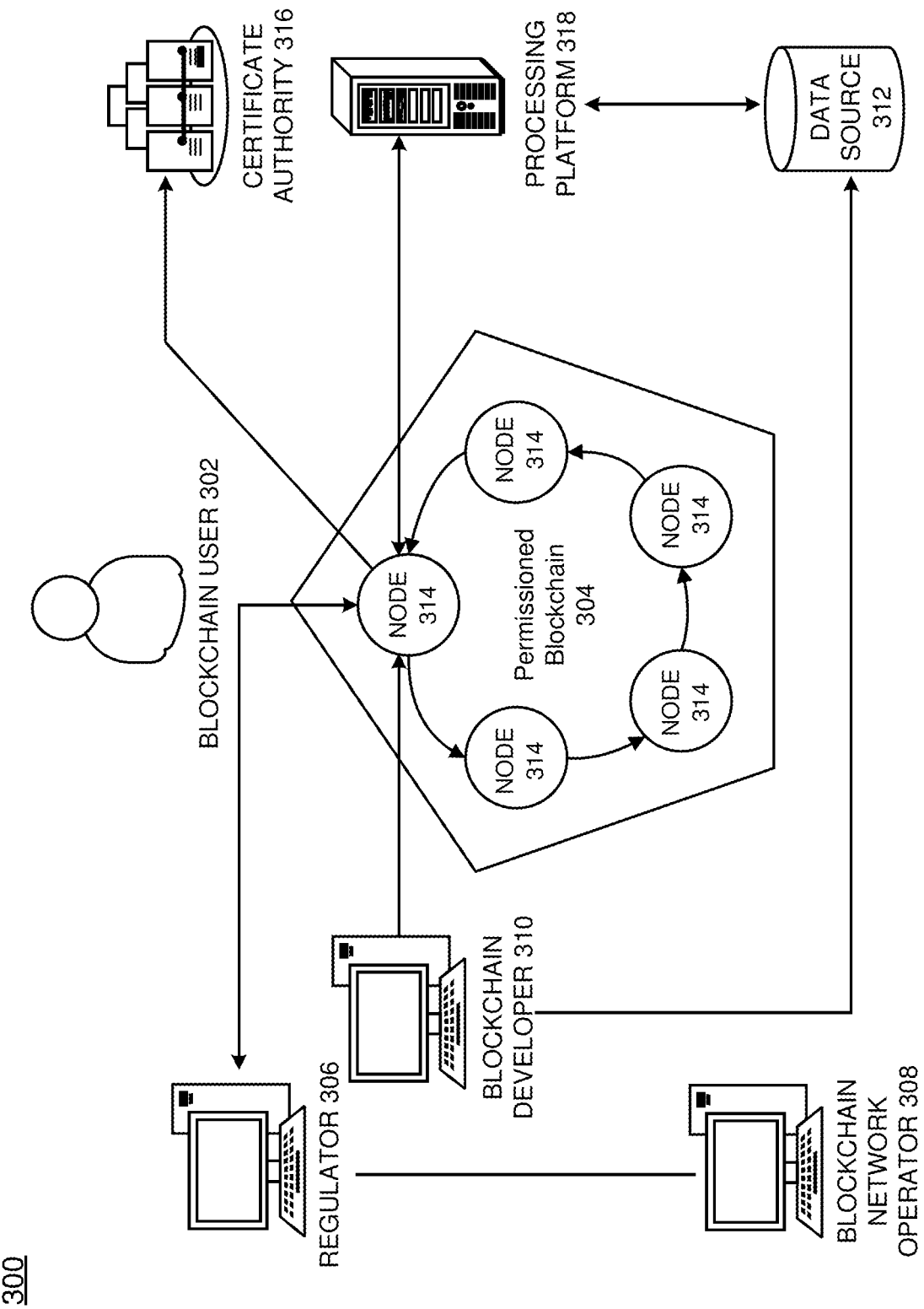
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
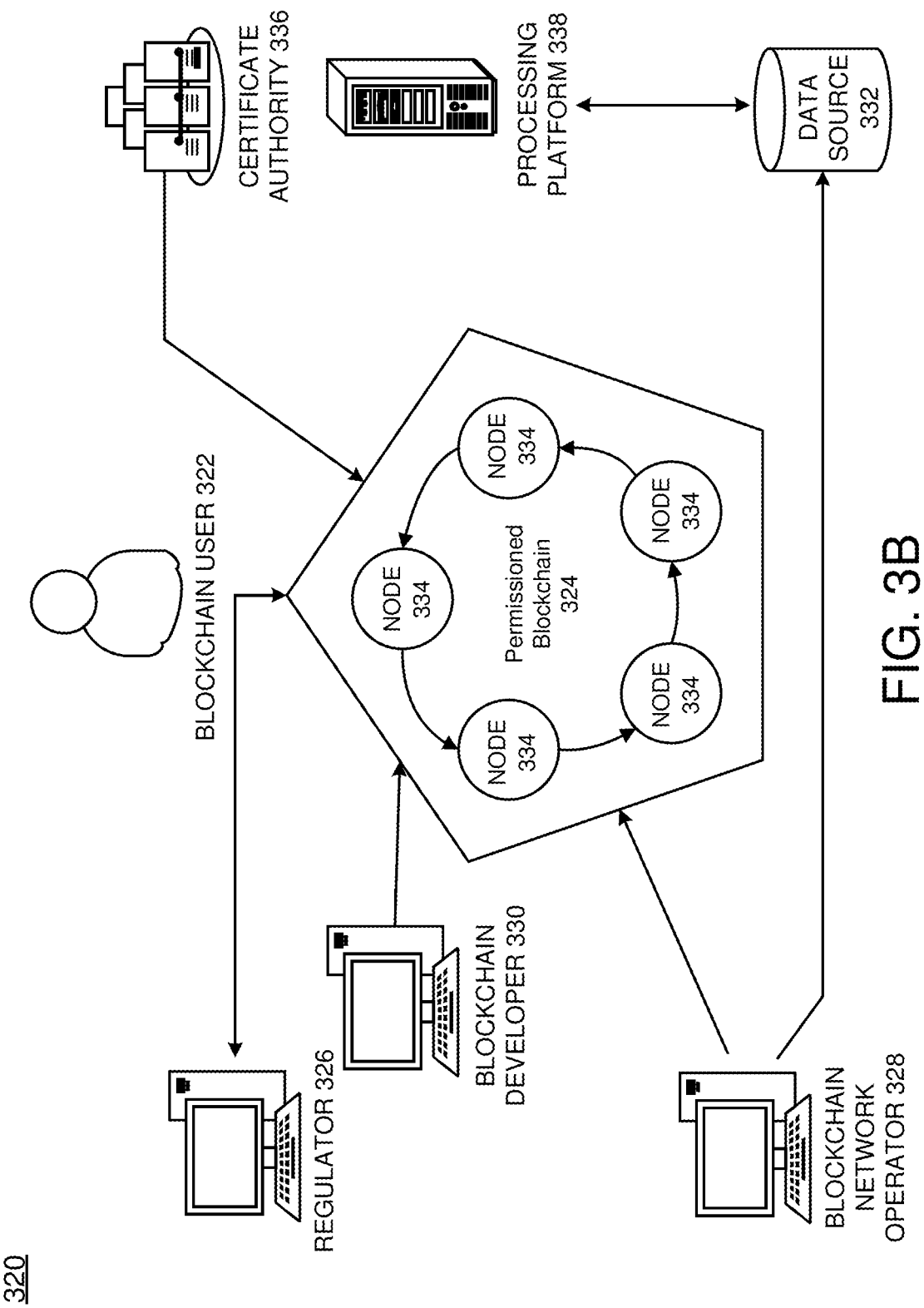

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
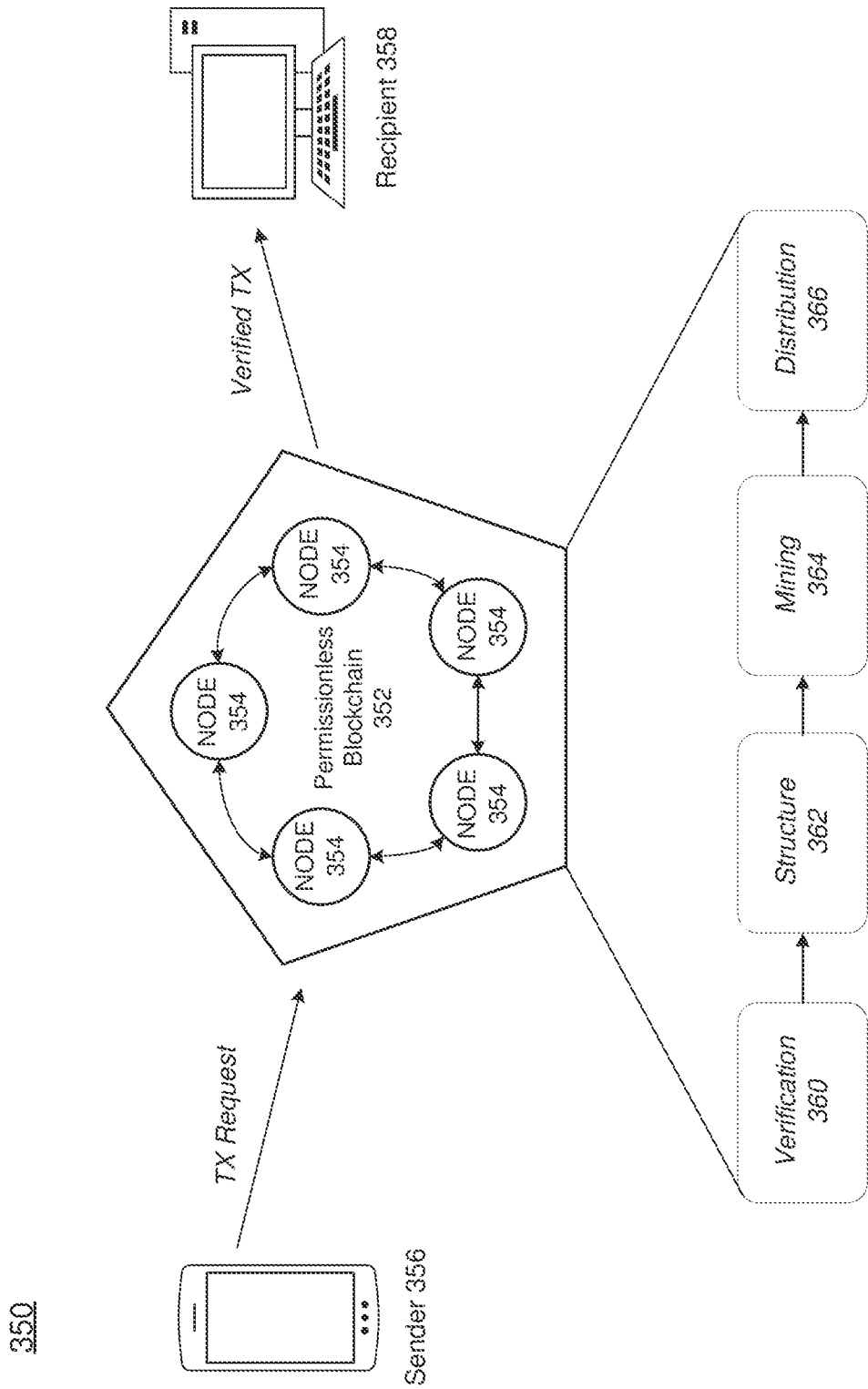

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake."
Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3E:
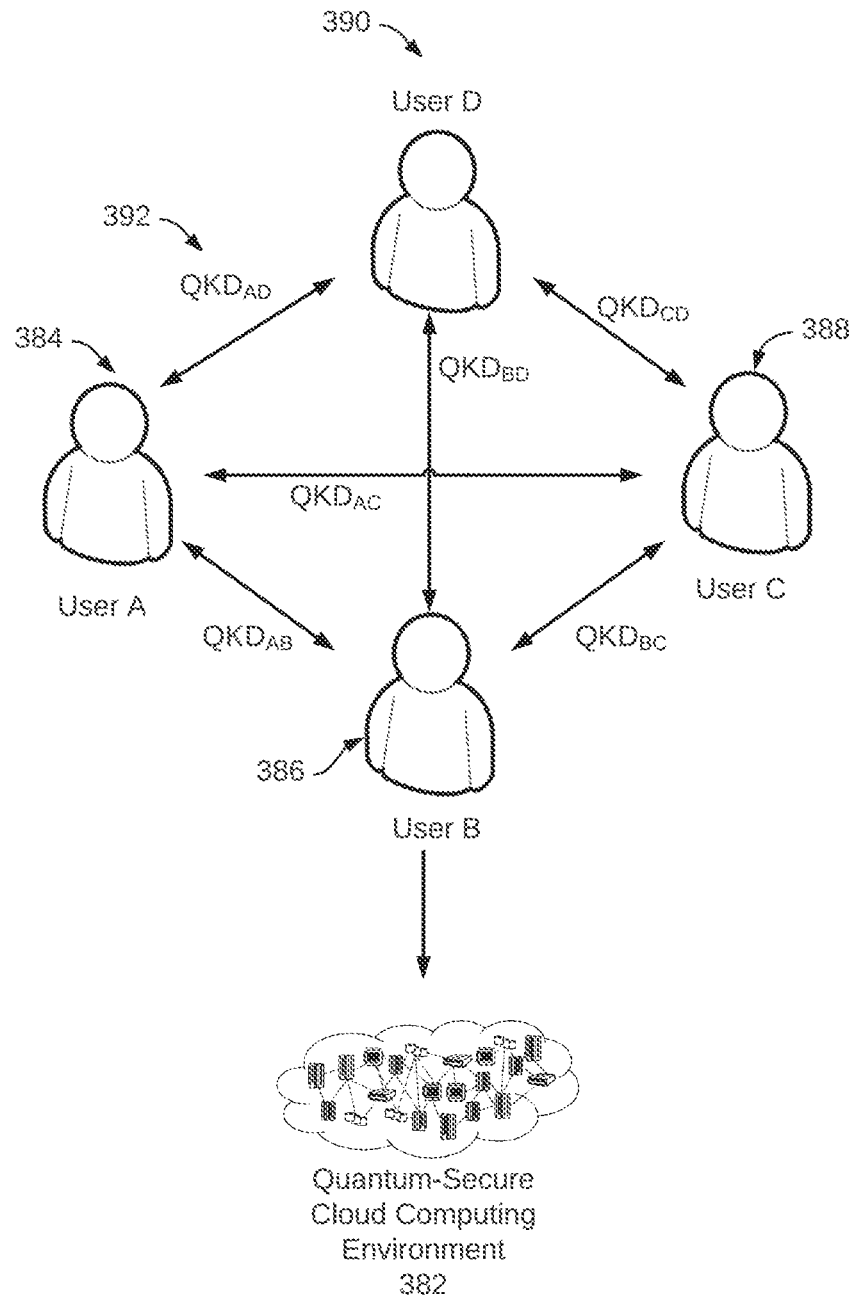
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376.

Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including QKDAB, QKDAc, QKDAD, QKDBc, QKDBD, and QKDcD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

Figure 4B:
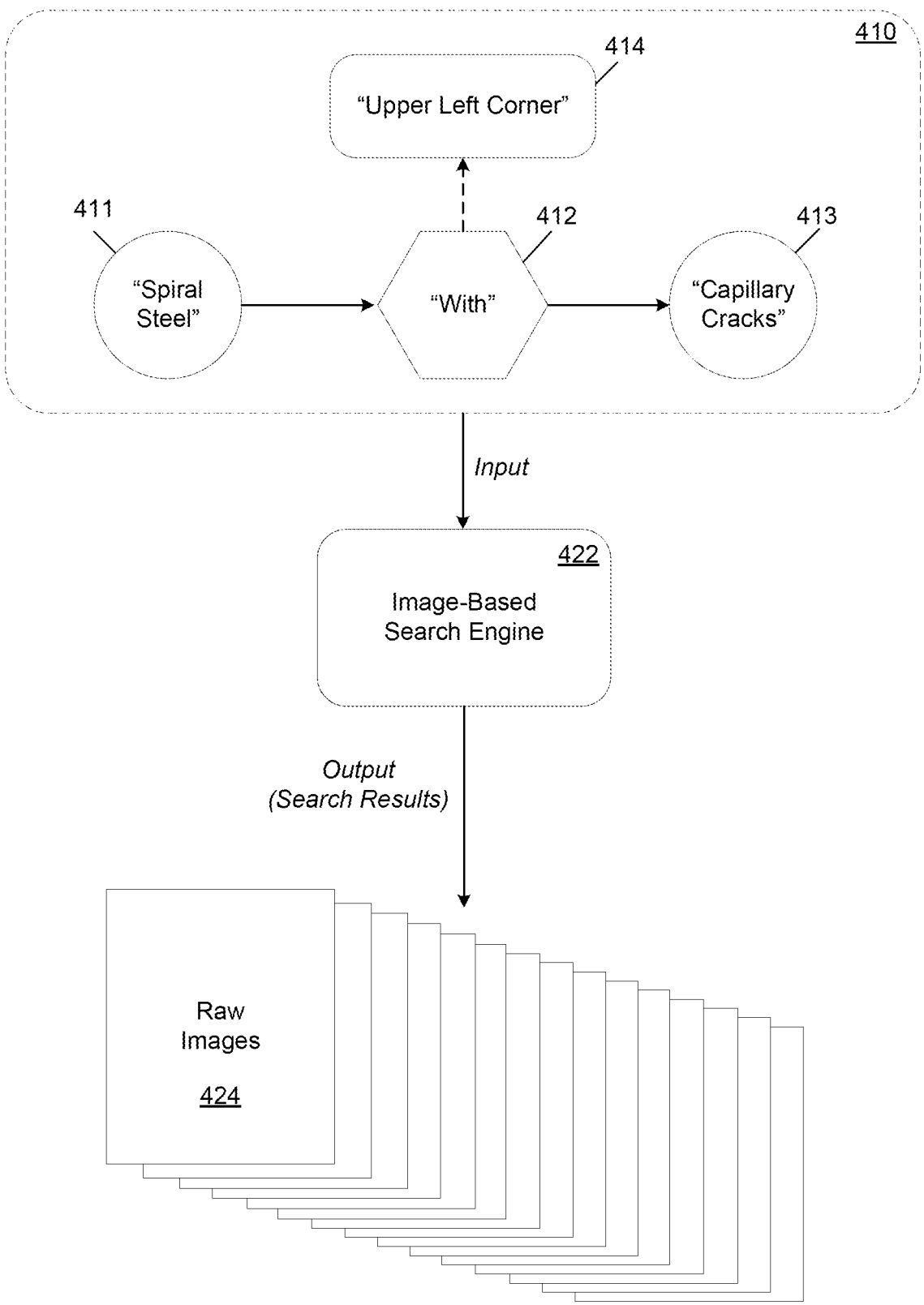
FIG. 4B is a diagram illustrating a process of retrieving raw images from an image-based search engine based on the extracted elements according to an example embodiment.

FIGS. 4A-4F described below provide examples of an end-to-end process for converting a string input such as a search query into a plurality/large set of training images for training a machine learning model, or other type of model. The examples below are described as being performed by a host or host platform which may include a software application, service, program, code, a computing system, server, cloud platform, machine learning models, and the like. In particular, FIG. 4A illustrates a process 400 of extracting elements from a string input according to an example embodiment. Referring to FIG. 4A, the host platform may receive an input string 402 that includes the text content "Spiral Steel with Capillary Cracks in the Upper Left Corner". In response, the host may identify various elements of the string via a syntactic analysis to identify one or more of a subject, a verb, a predicate, a feature, etc. As one example, the syntactic analysis may be performed via execution of a recurring neural network (RNN) that receives the input string/sentence and identifies the predefined elements.

In FIG. 4A, the syntactic analysis identifies semantic elements 411, 412, 413, and 414, corresponding to a subject, preposition, predicate, and adjective. These semantic elements 411, 412, 413, and 414 can then be used as a basis of an image-based search. For example, the semantic elements 411, 412, 413, and 414 may be input into a standard search engine such as publicly available on the world wide web, or a customized search engine capable of retrieving images from text-based descriptions.

For example, FIG. 4B illustrates a process 420 of retrieving raw images from an image-based search engine based on the extracted elements in FIG. 4A, according to an example embodiment. Referring to FIG. 4B, the elements 411, 412, 413, and 414 obtained from the syntactic analysis can be input to an image-based search engine 422 which then obtains one or more images 424 that match one or more of the elements 411, 412, 413, and 414. The raw images 424 may include a few images or a large amount of images. In either scenario, the example embodiments can use the raw images to create highly-effective training data for use in training a machine learning model.

FIG. 4C illustrates a process 430 of segmenting an image 425 (such as any of the raw images 424 in FIG. 4B) to emphasize a target region 427 of the image 425 with respect to a non-target area 429 of the image 425 according to an example embodiment. Here, the target region 427 may refer to a target object of the image which may be identified by pixel space occupation rate with respect to other objects in the image, etc. The image may be a snapshot image captured with a digital camera and may provide various views of a target object such as a rotor blade, a steel pipe, etc. A model such as a neural network may be trained to remove the non-target area 429 to generate a segmented images 435 which includes the target region 427 and an empty region where the non-target area 429 was previously displayed. Each raw image 424 in FIG. 4B can be segmented using the process 430 in FIG. 4C to generate a plurality of segmented images such as the segmented images 450A shown in FIG. 4D.

FIG. 4D illustrates an architecture 440 of a machine learning model for generating a 3D model 450B of an object according to an example embodiment. Segmented images 450A (e.g., such as the segmented image 435 from FIG. 4C, etc. or non-segmented images) may be input to the machine learning model for building a 3D model of the object. Referring to FIG. 4D, the machine learning model includes a plurality of autoencoders 451, 452, 453, 454, and 455 with some designed to perform both encoding and decoding (e.g., 451, 453, 455) and some designed to perform just encoding (452, 454). Here, autoencoder 451 may be configured to generate two confidence maps A1 and A2 based on the image. Autoencoder 452 may generate a depth map B based on the image. Autoencoder 453 may generate a reflectance map C based on the image. Autoencoder 454 may generate a viewpoint direction W based on the image. Autoencoder 455 may generate a light direction L based on the image.

Outputs of the autoencoders 451, 452, 453, 454, and 455 may be input to a renderer 456 such as an Auto Generative Adversarial Network (AutoGAN) or the like. The renderer 456 may build a three-dimensional model of the object based on the outputs from the autoencoders 451-455. In addition, the 3D model may be built based on reconstruction loss determination 457 that is obtained based on the outputs of autoencoders 451, 453, and 455, in this example. Here, each of the autoencoders 451, 453, and 455, may have a switch that enables the outputs to switch between being output the renderer 456 and output to the reconstruction loss determination 457.

By segmenting the images 450A of the object prior to creating the 3D model, the 3D model can be more accurate with less noise involved in the process. In some embodiments, the segmented images 450A may each be processed via the machine learning model to build one common 3D model 450B for the object, or a few 3D models of the object.

FIG. 4E illustrates a process of capturing snapshot images of the 3D model 450B and fusing a feature into the snapshot images according to an example embodiment. Here, the software may rotate the 3D model of the object and capture snapshot images 462 at different angles and also different distances. The rotation may be performed on any of the three-dimensions creating many different samples if necessary. Furthermore, a predefined image of the feature of interest (e.g., capillary cracks in the upper left corner, etc.) may be fused into the snapshot images for training purposes. Here, the image fusion may be performed via a neural network such as a Style Generative Adversarial Neural Network (StyleGAN) 470 to create fused images 472. The image fusion may be created via superposition of two image layers causing the image of the feature to "fuse" with the image of the object.

FIG. 4F illustrates a process 480 of training a machine learning model 482 based on the fused images 472 according to an example embodiment. Referring to FIG. 4F, the machine learning model 482 may be an image-based neural network that can be trained to identify image features from image data using the fused images 472 generated in FIG. 4E. Here, the fused images 472 may be fed into the machine learning model 482 while it is executing to train the machine learning model 482. Once trained, the trained machine learning model 482 can be used to identify image features (e.g., damage to an exterior of a steel pipe, etc.).

FIG. 5 illustrates a method 500 of generating a plurality of training images via image augmentation according to an example embodiment. Referring to FIG. 5, in 510 the method may include generating a three-dimensional (3D) model of an object via execution of a machine learning model on one or more images of the object. In 520, the method may include capturing a plurality of snapshots of the 3D model of the object at different angles to generate a plurality of snapshot images of the object. In 530, the method may include fusing a feature into each of the plurality of snapshots to generate a plurality of fused snapshots of the 3D model of the object. In 540, the method may include storing the plurality of fused snapshots of the 3D model of the object in memory.

In some embodiments, the method may further include segmenting the one or more images of the object to generate one or more segmented images in which an area around the object is removed, and generating the 3D model of the object based on the one or more segmented images. In some embodiments, the method may further include executing a machine learning model and inputting the plurality of fused snapshots into the executing machine learning model to train the machine learning model. In some embodiments, the generating may include generating the 3D model of the object via execution of a plurality of autoencoders which extract different attributes of the object from the one or more images. In some embodiments, the generating may include inputting the outputs of the plurality of autoencoders into a Style Generative Adversarial Network (StyleGAN) to generate the 3D model of the object.

In some embodiments, the method may further include receiving a string input entered via a user interface and retrieve a plurality of images of the object from an image-based search engine via the string input. In some embodiments, the method may further include identifying a subject, a predicate, and an object from the string, and querying the image-based search engine based on a relationship between the subject, the predicate, and the object. In some embodiments, the fusing may include fusing the feature into the plurality of snapshot images via execution of an Auto Generative Adversarial Network (AutoGAN).

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
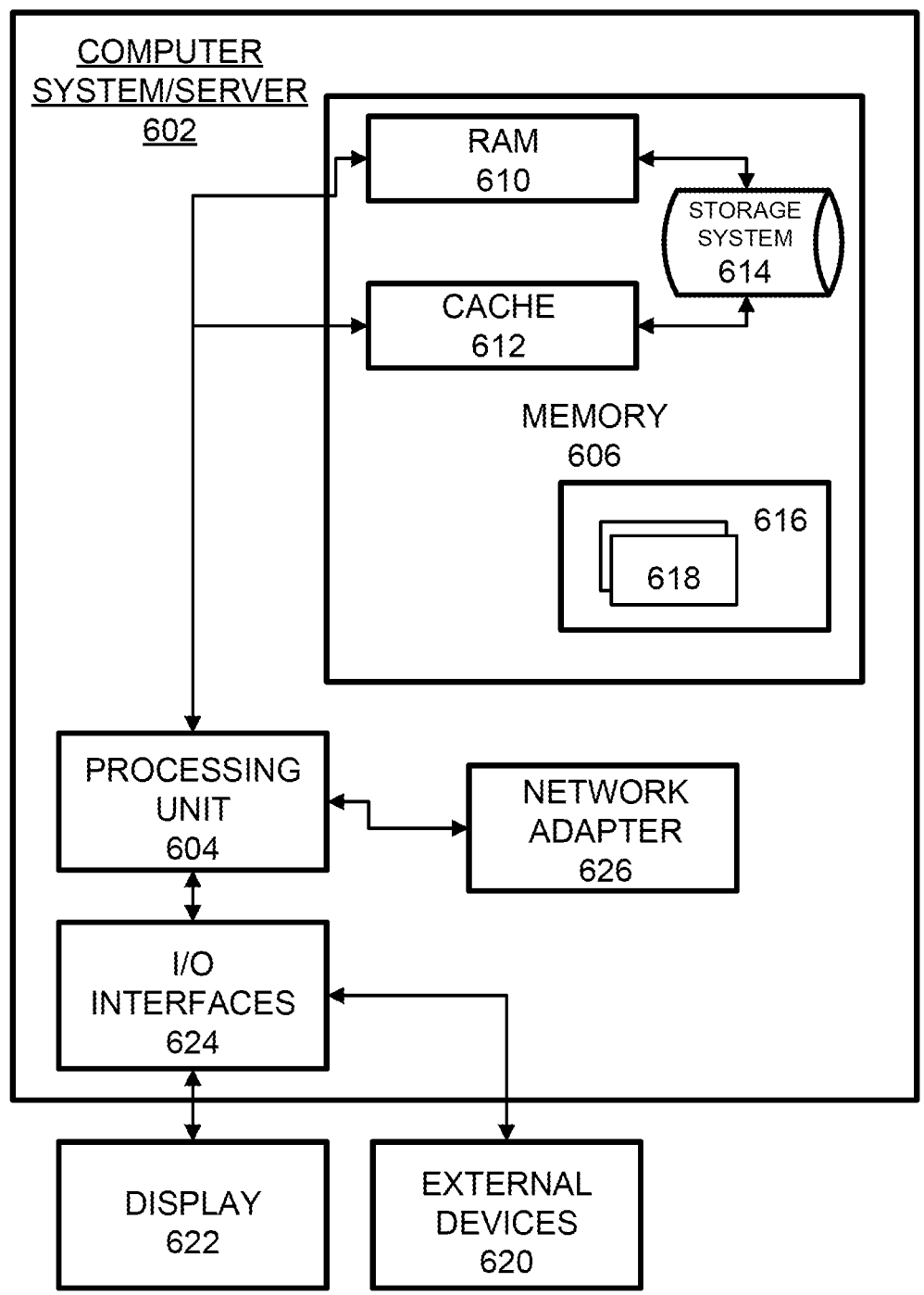
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a processor that, when executing instructions stored in an associated memory, is configured to:
   generate a three-dimensional (3D) model of an object via execution of a machine learning model using an image of the object,
   capture a plurality of snapshot images of the 3D model of the object at different angles,
   fuse an image of a feature into each snapshot image of the plurality of snapshot images to generate a plurality of fused snapshot images of the 3D model of the object; and
   store the plurality of fused snapshots of the 3D model of the object in a storage.

2. The apparatus of claim 1, wherein the processor is further configured to:
   identify a target and non-target regions around the image of the object;
   remove the non-target regions to generate a segmented image; and
   generate the 3D model of the object based on the segmented image.

3. The apparatus of claim 1, wherein the processor is configured to:
   input the plurality of fused snapshot images into the machine learning model to train the machine learning model.

4. The apparatus of claim 1, wherein the processor is configured to:
   execute a plurality of autoencoders of the machine learning model that extract different attributes of the object from the segmented image to generate the 3D model from the image.

5. The apparatus of claim 4, wherein the processor is configured to:
   input outputs of the plurality of autoencoders into a Style Generative Adversarial Network (StyleGAN) to generate the 3D model of the object.

6. The apparatus of claim 1, wherein the processor is further configured to:
   receive a string input entered via a user interface, and
   retrieve the image of the object from an image-based search engine based on the string input.

7. The apparatus of claim 6, wherein the processor is configured to:
   identify a subject, a predicate, and an object from the string;
   query the image-based search engine based on a relationship between the subject, the predicate, and the object; and
   retrieve the image from the image-based search engine in response to the query.

8. The apparatus of claim 1, wherein the feature is a predefined image.

9. A method comprising:
   generating a three-dimensional (3D) model of an object via execution of a machine learning model using an image of the object;
   capturing a plurality of snapshot images of the 3D model of the object at different angles;
   fusing an image of a feature into each snapshot image of the plurality of snapshot images to generate a plurality of fused snapshot images of the 3D model of the object; and
   storing the plurality of fused snapshots of the 3D model of the object in a memory.

10. The method of claim 9, further comprising:
    identifying a target and non-target regions around the image of the object;
    remove the non-target regions to generate a the segmented image; and
    generating the 3D model of the object based on the segmented image.

11. The method of claim 9, further comprising:
    inputting the plurality of fused snapshot images into the executing machine learning model to train the machine learning model.

12. The method of claim 9, the further comprising:
    executing a plurality of autoencoders of the machine learning model that extract different attributes of the object from the segmented image to generate the 3D model from the image.

13. The method of claim 12, further comprising:
inputting outputs of the plurality of autoencoders into a Style Generative Adversarial Network (StyleGAN) to generate the 3D model of the object.

14. The method of claim 9, further comprising:
receiving a string input entered via a user interface; and
retrieve the image of the object from an image-based search engine based on the string input.

15. The method of claim 14, further comprising:
identifying a subject, a predicate, and an object from the string;
querying the image-based search engine based on a relationship between the subject, the predicate, and the object; and
retrieving the image from the image-based search engine in response to the query.

16. The method of claim 9, wherein the feature is a predefined image.

17. A non-transitory computer-readable storage medium comprising instructions that, when executed by a processor, cause the processor to perform:
generating a three-dimensional (3D) model of an object via execution of a machine learning model using an image of the object;
capturing a plurality of snapshot images of the 3D model of the object at different angles to generate a plurality of snapshot images of the object;
fusing an image of a feature into each snapshot image of the plurality of snapshot images to generate a plurality of fused snapshot images of the 3D model of the object; and
storing the plurality of fused snapshots of the 3D model of the object in a memory.

18. The non-transitory computer-readable storage medium of claim 17, wherein the instructions further cause the processor to perform:
identifying a target and non-target regions around the image of the object;
remove the non-target regions to generate a the segmented image; and
generating the 3D model of the object based on the segmented image.

19. The non-transitory computer-readable storage medium of claim 17, wherein the instructions further cause the processor to perform:
inputting the plurality of fused snapshot images into the executing machine learning model to train the machine learning model.

20. The non-transitory computer-readable storage medium of claim 17, wherein the instructions further cause the processor to perform:
executing a plurality of autoencoders of the machine learning model that extract different attributes of the object from the segmented image to generate the 3D model from the image.

* * * * *